(12) United States Patent
Sidlosky et al.

(10) Patent No.: US 8,073,607 B2
(45) Date of Patent: Dec. 6, 2011

(54) METHOD FOR POPULATING MOTOR VEHICLE YAW GAIN TABLES FOR USE IN AN ELECTRONIC STABILITY CONTROL SYSTEM

(75) Inventors: David M. Sidlosky, Beverly Hills, MI (US); Christopher A. Kinser, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 974 days.

(21) Appl. No.: 12/020,635

(22) Filed: Jan. 28, 2008

(65) Prior Publication Data

US 2009/0192676 A1     Jul. 30, 2009

(51) Int. Cl.
*B60W 30/02* (2006.01)
(52) U.S. Cl. ......................................... 701/82
(58) Field of Classification Search .............. 180/82, 180/84, 85, 86
See application file for complete search history.

(56) References Cited

U.S. PATENT DOCUMENTS

| | | | | |
|---|---|---|---|---|
| 4,969,212 | A | * | 11/1990 | Walter .............. 701/29 |
| 5,941,919 | A | | 8/1999 | Pastor et al. |
| 6,862,506 | B2 | * | 3/2005 | Boswell et al. ........... 701/41 |
| 2002/0016661 | A1 | * | 2/2002 | Frediani et al. ........... 701/69 |
| 2009/0182476 | A1 | * | 7/2009 | Sidlosky et al. ........... 701/72 |

OTHER PUBLICATIONS

"Surface Vehicle Information Report: Automotive Stability Enhancement Systems" Society of Automotive Engineers SAE International publication J2564, dated: issued on Dec. 2000 and revised on Jun. 2004.
"Electronic Stability Control: Review of Research and Regulations" prepared for Roads and Traffic Authority of NSW, by Michael Paine, Vehicle Design and Research Pty Limited, Beacon Hill, NSW, Australia 2100, Report G248, dated Jun. 2005.
"Surface Vehicle Recommended Practice: Steady-State Directional ControlTest procedures for Passenger Cars and Light Trucks" Society of Automotive Engineers SAE International publication J266, dated Jan. 1996.
"International Standard: Road Vehicles—Vehicle Dynamics and Road-Holding Ability—Vocabulary" International Standards Organization, Switzerland, ISO document 8855, dated Dec. 15, 1991.
"Passenger Vehicle Steady-State Directional Stability Analysis Utilizing EDVSM and SIMON" by D.A. Fittanto and A.S. Senalik, Engineering Dynamics Corporation, Beaverton, OR 97008, publication WP# 2004-3, dated 2004.

* cited by examiner

*Primary Examiner* — Kevin Hurley

(57) ABSTRACT

An automated and algorithmic method utilizing motor vehicle steering geometry knowledge, applicable to small and large turn angles, along with knowledge of motor vehicle understeer gradient, for determining motor vehicle yaw gain by which a motor vehicle yaw gain table is populated for use by an electronic stability control system of the motor vehicle. The method may utilize either a recursive methodology of population or an open loop methodology of population.

14 Claims, 6 Drawing Sheets

METHOD FOR POPULATING MOTOR VEHICLE YAW GAIN TABLES FOR USE IN AN ELECTRONIC STABILITY CONTROL SYSTEM

TECHNICAL FIELD

The present invention relates to motor vehicles and, more particularly, to motor vehicles utilizing electronic stability control systems.

BACKGROUND OF THE INVENTION

Electronic Stability Control (ESC) is the generic term for systems designed to improve a motor vehicle's handling, particularly at the limits where the driver might lose control of the motor vehicle. See, for example, the Society of Automotive Engineers (SAE) document on "Automotive Stability Enhancement Systems", publication J2564 (12/2000, 6/2004). ESC compares the driver's intended direction in steering and braking inputs to the motor vehicle's response, via lateral acceleration, rotation (yaw) and individual wheel speeds, and then brakes individual front or rear wheels and/or reduces excess engine power as needed to help correct understeer (plowing) or oversteer (fishtailing). ESC also integrates all-speed traction control which senses drive-wheel slip under acceleration and individually brakes the slipping wheel or wheels, and/or reduces excess engine power until control is regained. ESC cannot override a car's physical limits. If a driver pushes the possibilities of the car's chassis and ESC too far, ESC cannot prevent a crash. It is a tool to help the driver maintain control. ESC combines anti-lock brakes, traction control and yaw control (yaw is spin around the vertical axis). Methods of ESC operation are also discussed in report G248 dated Jun. 2, 2005 "Electronic Stability Control: Review of Research and Regulations" by M. Paine, Vehicle Design and Research Pty Limited, 10 Lanai Place, Beacon Hill, NSW, Australia 2100.

ESC systems use several sensors in order to determine the state the driver wants the motor vehicle to be in (driver demand). Other sensors indicate the actual state of the motor vehicle (motor vehicle response). The ESC control algorithm compares both states and decides, when necessary, to adjust the dynamic state of the motor vehicle. The sensors used for ESC have to send data at all times in order to detect possible defects as soon as possible. They have to be resistant to possible forms of interference (rain, potholes in the road, etc.). The most important sensors are: 1) steering wheel sensor, used to determine the angle the driver wants to take, often based on anisotropic magnetoresistive (AMR) elements; 2) lateral acceleration sensor, used to measure the lateral acceleration of the motor vehicle; 3) yaw sensor, used to measure the yaw angle (rotation) of the motor vehicle, can be compared by the ESC with the data from the steering wheel sensor in order to take a regulating action; and 4) wheel speed sensors used to measure the wheel speeds.

ESC uses, for example, a hydraulic modulator to assure that each wheel receives the correct brake force. A similar modulator is used with anti-lock brake systems (ABS). ABS needs to reduce pressure during braking, only. ESC additionally needs to increase brake pressure in certain situations.

The heart of the ESC system is the electronic control unit (ECU) or electronic control module (ECM), i.e., motor vehicle controller or microprocessor. Diverse control techniques are embedded in the ECU and often, the same ECU is used for diverse systems at the same time (ABS, traction control, climate control, etc.). The desired motor vehicle state is determined based on the steering wheel angle, its gradient and the wheel speed. Simultaneously, the yaw sensor measures the actual state. The controller computes the needed brake or acceleration force for each wheel and directs the actuation of, for example, the valves of an hydraulic brake modulator.

The marketing names of ESC systems vary. For example, BMW refers to its ESC system as Dynamic Stability Control (DSC), Mercedes and Bosch call it Electronic Stability Program (ESP), Toyota calls it Vehicle Stability Control (VSC), and Ford (US) calls it AdvanceTrac. See, for example, SAE document J2564, which also lists known terms and acronyms for ESC. StabiliTrak is General Motors' trademark name for their ESC system. StabiliTrak, introduced in 1997 Cadillac models, is now available on many of the company's cars and trucks. StabiliTrak helps reduce or prevent motor vehicle spins and excessive understeer. Individual wheel brake and/or engine interventions assist the driver in reducing the difference between the driver's requested direction and the actual motor vehicle direction. StabiliTrak also integrates ABS and traction control systems (TCS). The StabiliTrak control algorithm determines when and how to activate the ESC system based on data from an additional sensor set. The brake modulator then applies corrective yaw movements through individual wheel brake control to bring the motor vehicle back toward the driver's requested direction.

Motor vehicles utilizing electronic stability control systems require some means of determination of the driver's intended motor vehicle behavior (i.e., intended motor vehicle path or track). In General Motors' (GM's) StabiliTrak system these means are accomplished by the driver command interpreter. GM's StabiliTrak system obtains a motor vehicle yaw gain using a yaw gain table with present motor vehicle speed and intended road-wheel angle (driver's hand-wheel angle divided by the steering gear ratio) as yaw gain table lookup arguments. The steady state desired vehicle yaw rate for the ESC system is the product of this motor vehicle yaw gain obtained from the yaw gain table and the driver's intended road-wheel angle. With GM's StabiliTrak system, dynamics are then imparted through the use of a second order filter, with some means of determining the natural frequency and damping, either through table look-up as a function of motor vehicle reference velocity, or using an equation based approach, as a function of motor vehicle parameters and motor vehicle reference velocity. Populating the motor vehicle yaw gain table is done by a large number of step-steer maneuvers, well know in the art, on dry pavement, at a range of motor vehicle speeds and steering angles. GM's StabiliTrak system is exemplified by U.S. Pat. No. 5,941,919, issued Aug. 24, 1999 and assigned to the assignee of the present invention, which patent is hereby incorporated herein in its entirety by reference.

Presently, calibration of the motor vehicle yaw gain table, for example Table 2 in U.S. Pat. No. 5,941,919, is traditionally done by performing a very large number of step-steer maneuvers, well known in the art, over a range of motor vehicle speeds and road-wheel angles, by which the motor vehicle yaw gain is computed as a ratio of steady-state motor vehicle yaw rate to road-wheel angle. This requires a large number of motor vehicle tests to populate the motor vehicle yaw gain table. In the course of conducting these tests, motor vehicle variation can cause significant error. This variation can be due to tire heating, tire wear, etc. Furthermore, the process is manual in nature, and, as such, is prone to human error. Moreover, motor vehicle yaw gain table entries are not independent of the driver command interpreter filter parameters and care must be taken to insure consistency. Also, if motor vehicle yaw gain table entries beyond the lateral acceleration capability of the motor vehicle are required, they must be manually calculated and entered.

As ESC systems have evolved over time, more precise computation of motor vehicle yaw rates have been necessitated, requiring an ever larger number of motor vehicle tests to populate the required motor vehicle yaw gain tables. For example, utilizing the prior art, at least 1089 motor vehicle tests are needed to populate the yaw gain table to the maximum lateral acceleration capability of the motor vehicle for today's StabiliTrak system of GM. If motor vehicle yaw gain table entries beyond the lateral acceleration capability of the motor vehicle are required, they must still be manually calculated and entered.

Presently, the deficiencies in the prior art yaw gain table population method are: 1) a large number of motor vehicle tests are required to populate the motor vehicle yaw gain table; 2) in the course of conducting these tests, motor vehicle variation can cause significant error, such as for example due to tire heating, tire wear, etc.; 3) the testing process is manual in nature, and as such is prone to human error; 4) the motor vehicle yaw gain table entries of the tests are not independent of the driver command interpreter filter parameters, so care must be taken to insure consistency; and 5) manual calculations of yaw gain table entries that are beyond the lateral capability of the motor vehicle are required.

Accordingly, what is needed in the art is an automated, more precise, less costly and time-consuming method of populating the motor vehicle yaw gain table for use by ESC systems.

SUMMARY OF THE INVENTION

The present invention is an automated and algorithmic method utilizing, at least, motor vehicle steering geometry knowledge, applicable to small and large turn angles (to be described later), for determining motor vehicle yaw gain by which a motor vehicle yaw gain table is populated and can be used by an ESC system as, for example, General Motors' (GM's) StabiliTrak system. With GM's StabiliTrak system, the driver command interpreter determines a driver's intended behavior utilizing the vehicle yaw gain table and other parameter and sensor inputs. The vehicle yaw gain table resides, typically, within the read only memory (ROM) of, preferably, the main engine controller, ECM, or ECU of a vehicle or another microprocessor located within the vehicle. Herein "motor vehicle" is simply referred to as "vehicle".

The present invention utilizes the vehicle understeer gradient as a function of vehicle lateral acceleration to automatically populate a vehicle yaw gain table using an algorithmic approach. The vehicle understeer gradient is a vehicle parameter well known in the art and can be empirically obtained or calculated by methods well known in the art, such as step steer maneuvers, ramp steer input maneuvers, or constant radius test maneuvers. See, for example, "Surface Vehicle Recommended Practice", SAE document J266, (1/1996); "Steady-State Directional Control Test Procedures for Passenger Cars and Light Trucks", International Standards Organization (ISO) document 8855 (Dec. 15, 1991); and "Passenger Vehicle Steady-State Directional Stability Analysis Utilizing EDVSM and SIMON", report WP# 2004-3 by Engineering Dynamics Corporation of Beaverton, Oreg. (2004). Vehicle lateral accelerations up to a maximum vehicle lateral acceleration for a given vehicle or vehicle model can also be empirically determined or calculated by techniques well known in the art.

The present invention radically reduces the number of vehicle tests required as compared to the prior art. For example, if a step steer maneuver, at a vehicle speed of, typically, 100 kph, with each steer angle corresponding to 1 $m/s^2$ increment in vehicle lateral acceleration for left and right turns, is used to obtain the vehicle understeer gradient, then eighteen tests are required for a, typical, maximum vehicle lateral acceleration of 9 $m/s^2$ to populate a 33 by 33 yaw gain table utilizing the present invention, whereas at least 1089 tests would be needed utilizing the techniques of the prior art.

Alternatively, if, for example, a ramp steer input maneuver at a constant vehicle speed or a constant radius test maneuver is used to obtain the vehicle understeer gradient, only two tests are needed to populate a 33 by 33 yaw gain table utilizing the present invention, one test for left turns and one test for right turns, whereas at least 1089 tests would be needed utilizing the techniques of the prior art.

Since the present invention is an automated algorithmic method of populating a vehicle yaw gain table, it minimizes calibration errors due to human error as compared to the prior art. The present invention requires very few tests and, thus, minimizes error due to tire heating, tire wear, etc. as compared to the prior art. The present invention is also more consistent than the prior art and can automatically generate vehicle yaw gain table entries beyond the lateral acceleration capability of the vehicle, if required, for tailoring the vehicle understeer response, whereas these entries must be manually calculated and entered utilizing the prior art.

A first preferred embodiment of the present invention is a recursive method for determining vehicle yaw gain by which a vehicle first yaw gain table is populated. The recursive method of the first preferred embodiment of the present invention employs first through third steps to populate a vehicle first yaw gain table as a function of, at least, vehicle reference speed and vehicle front steer angle.

The first step utilizes vehicle geometry to obtain a first matrix or first table wherein each entry of the first matrix or first table denotes a vehicle front steer angle as a function of, at least, a vehicle turn radius.

The second step computes at least one vehicle large angle geometry correction factor as a function of at least one vehicle turn radius using at least one entry of the first matrix or first table obtained in the first step. The at least one vehicle large angle geometry correction factor may be stored in a second matrix or second table or as a polynomial whose coefficients can be empirically determined or calculated by means well known in the art.

The third step generates a third matrix or third table, herein referred to as the first yaw gain matrix or first yaw gain table. Each entry of the first yaw gain table represents a unique vehicle yaw gain being a function of, at least, a vehicle reference speed and a front steer angle derived from, at least, a vehicle large geometry correction factor and a vehicle understeer gradient, whereby the vehicle understeer gradient is a function of, at least, a desired vehicle lateral acceleration. All entries of the first yaw gain table are limited to a maximum value such that the desired vehicle lateral acceleration is less than or equal to a predetermined, for example empirically, maximum vehicle lateral acceleration which may correspond to a value higher than the vehicle maximum lateral acceleration capability to tailor the vehicle yaw response of the ESC system.

A second or alternative preferred embodiment of the present invention is an open loop method for determining vehicle yaw gain by which a vehicle second yaw gain table is populated. The open loop method of the second preferred embodiment of the present invention employs three steps to populate a vehicle second yaw gain table as a function of, at least, vehicle reference speed and vehicle front steer angle.

The first alternative step utilizes vehicle geometry to obtain a first alternative matrix or first alternative table wherein each entry of the first alternative matrix or first alternative table denotes a vehicle front steer angle as a function of, at least, a vehicle turn radius. The first alternative step of the second or alternative preferred embodiment of the present invention is identical to the first step of the first preferred embodiment of the present invention.

The second alternative step obtains a second alternative matrix or second alternative table wherein each entry of the second alternative matrix or second alternative table denotes a vehicle desired front steer angle as a function of, at least, a vehicle yaw rate and a vehicle reference speed derived from, at least, one entry of the first alternative matrix or first alternative table obtained in the first alternative step and a vehicle understeer gradient, whereby the vehicle understeer gradient is a function of, at least, a desired vehicle lateral acceleration.

The third alternative step generates a third alternative matrix or third alternative table, herein referred to as the second yaw gain matrix or second yaw gain table. Each entry of the second yaw gain table represents a unique vehicle yaw gain being a function of, at least, a vehicle reference speed and a front steer angle. All entries of the second yaw gain table are limited to a maximum value such that the desired vehicle lateral acceleration is less than or equal to a predetermined, for example empirically, maximum vehicle lateral acceleration which may correspond to a value higher than the vehicle maximum lateral acceleration capability to tailor the vehicle yaw response of the ESC system.

Many variations in the embodiments of present invention are contemplated, as described herein in more detail. Other applications of the present invention will become apparent to those skilled in the art when the following description of the best mode contemplated for practicing the invention is read in conjunction with the accompanying drawings.

DESCRIPTION OF THE PREFERRED EMBODIMENT

Figure 1:
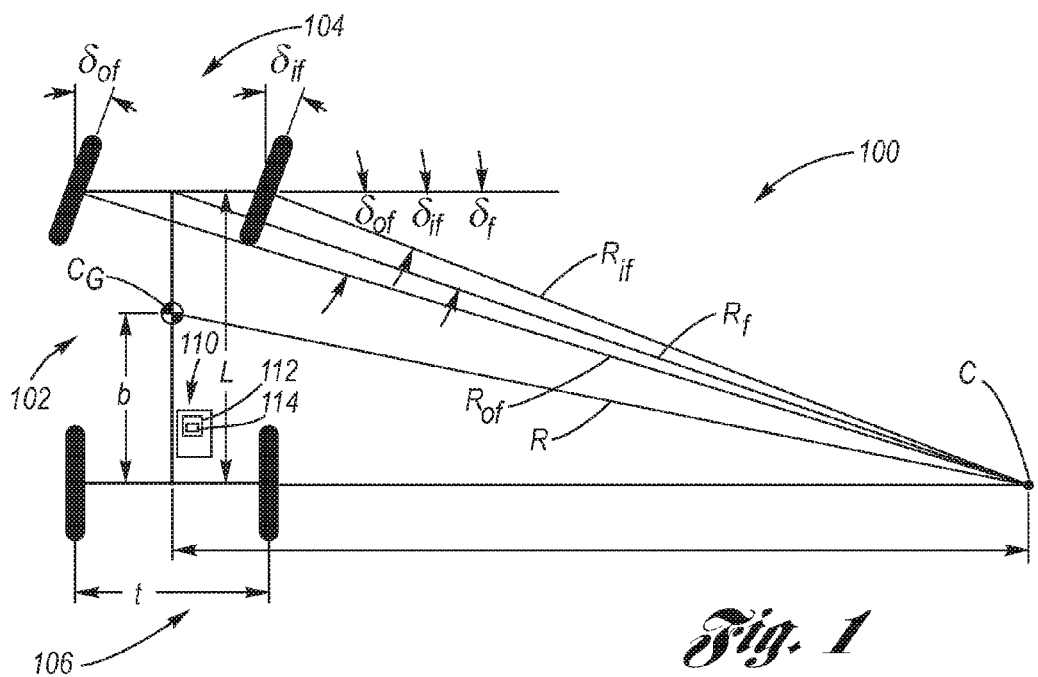
FIG. 1 is a schematic representation of vehicle steering geometry.

Referring now to the Drawings, FIG. 1 is a schematic representation 100 of vehicle steering geometry in accordance with International Standards Organization (ISO) document 8855, wherein CG denotes the center of gravity of the vehicle 102 and C denotes the center of a turn of radius R measured between the CG and C. The front and rear of the vehicle are designated 104 and 106, respectively. Also shown, in accordance with the disclosure of the hereinabove incorporated by reference U.S. Pat. No. 5,941,919, the vehicle 102 additionally includes an electronic stability control system 110 having a microprocessor 112 and a yaw gain table 114 accessed by the microprocessor for executing commands of the stability control system.

A steer angle $\delta_1$ is often described in the literature, well known in the art, as:

$$\delta_1 = L/R + K_u * a_y \quad (1)$$

where, as depicted in FIG. 1, L is the vehicle wheelbase and R is the vehicle turn radius between the center of the turn, C, and the CG. In equation (1), $K_u$ is the vehicle understeer gradient and $a_y$ is the vehicle lateral acceleration. Equation (1) is based on the assumption that R is much larger than L and that small angle assumptions, well known in the art, can be made such that the arctangent of an angle is approximately equal to the angle in radians. If the vehicle is not moving (i.e., vehicle velocity is zero or $a_y$ is zero), the steer angle $\delta_1$ in equation (1) corresponds to the front steer angle $\delta_f$ depicted in FIG. 1 based on the assumption that R is much larger than L and that small angle assumptions are valid. In tight turns, both assumptions lead to significant errors since large turn angles are encountered and, under these conditions, R is not much larger than L and small angle assumptions are invalid.

To correct these errors, the present invention utilizes vehicle steering geometry, in accordance with International Standards Organization (ISO) document 8855, to obtain geometric and mathematical relationships valid for large turn angles as well as small turn angles.

Referring to FIG. 1, using geometric and mathematical relationships, valid for large turn angles as well as small turn angles, the inner front steer angle, $\delta_{if}$, outer front steer angle, $\delta_{of}$, and front steer angle, $\delta_f$, can be expressed as:

$$\delta_{if} = \arctan(L/(\sqrt{(R^2-b^2)}-t/2)) \quad (2)$$

$$\delta_{of} = \arctan(L/(\sqrt{(R^2-b^2)}+t/2)) \quad (3)$$

$$\delta_f = \arctan((2*\tan\delta_{if}*\tan\delta_{of})/(\tan\delta_{if}+\tan\delta_{of})) \quad (4)$$

where depicted in FIG. 1, b is the distance between the CG and rear axle of the vehicle and t is the distance between the rear wheels.

Figure 2:
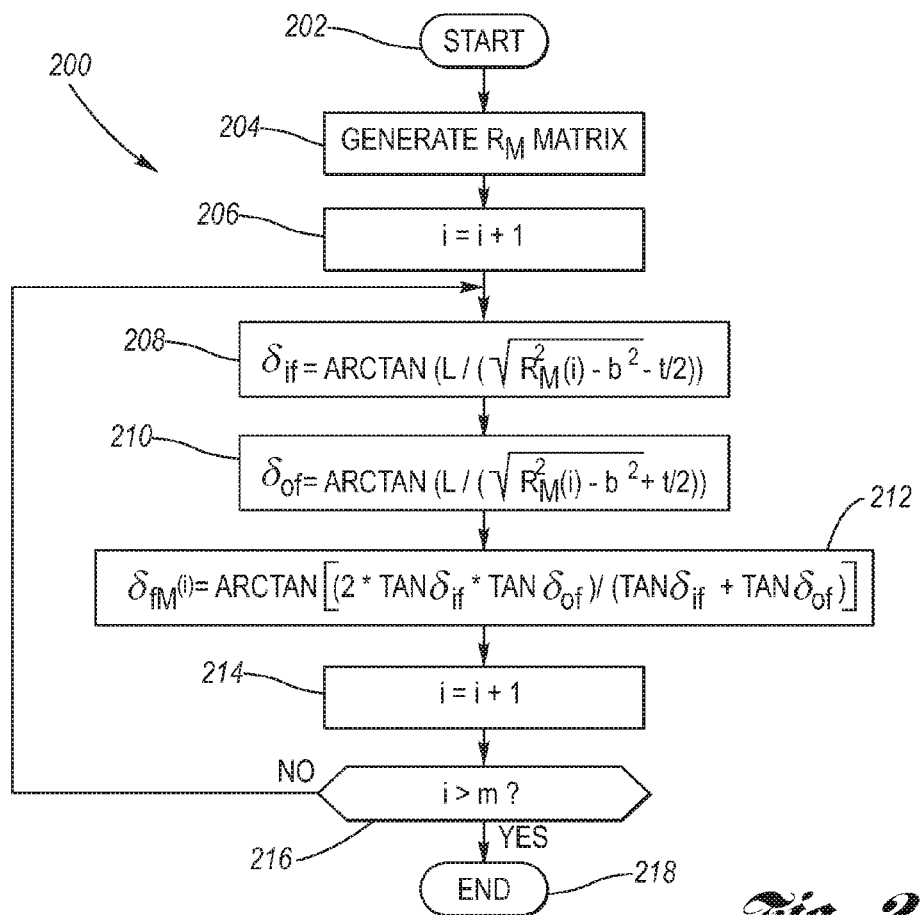
FIG. 2 is a first flow chart by which vehicle front steer angles are generated and utilized by the first and second preferred embodiments according to the present invention.

FIG. 2 is a first flow chart 200 by which a vehicle front steer angle matrix $\delta_{fM}$ is generated and utilized by the first and second preferred embodiments according to the present invention. The flow chart of FIG. 2 utilizes the geometric and mathematical relationships, valid for large turn angles as well as small turn angles, as derived from FIG. 1 using equations (2) through (4).

Flow chart 200 starts at Block 202 and proceeds to Block 204 where a vehicle turn radius matrix $R_M$ is generated using techniques, for example MATLAB, well known in the art. MATLAB is a high-level language and interactive environment produced by "The MathWorks" that enables the user to perform computationally intensive tasks and is well known in the art. The vehicle turn radius matrix $R_M$ has, for example, 17 entries varying between a minimum vehicle turn radius of, typically, 4 m to a maximum vehicle turn radius of, typically, 50 m. Entries between the minimum vehicle turn radius and the maximum vehicle turn radius of $R_M$ are, preferably, spaced logarithmically to minimize errors. The minimum vehicle turn radius entry and maximum vehicle turn radius entry in $R_M$ can be empirically determined for a particular vehicle or vehicle model. An example of a vehicle turn radius matrix $R_M$ having 17 entries is given in Table 1.

TABLE 1

Vehicle Turn Radius Matrix $R_M$

| Entry | Vehicle Turn Radius (m) |
|---|---|
| 1 | 5.0000 |
| 2 | 5.7739 |
| 3 | 6.6676 |
| 4 | 7.6996 |
| 5 | 8.8914 |
| 6 | 10.2676 |
| 7 | 11.8569 |
| 8 | 13.6921 |
| 9 | 15.8114 |
| 10 | 18.2587 |
| 11 | 21.0848 |
| 12 | 24.3484 |
| 13 | 28.1171 |
| 14 | 32.4691 |
| 15 | 37.4947 |
| 16 | 43.2982 |
| 17 | 50.0000 |

Control proceeds from Block 204 to Block 206 whereat an index i is initiated to a value of one after which control is passed to Block 208.

At block 208, an inner front steer angle, $\delta_{if}$, is calculated using equation (2) wherein the vehicle turn radius R of equation (2) is replaced with $R_M(i)$, the ith entry of vehicle turn radius matrix $R_M$. For example, if the index i has a value of one, then $R_M(i)=R_M(1)$ and, for example, using Table 1, $R_M(1)=5.0000$ m would be the value of $R_M(i)$ used in Block 208 with the index i=1. Control then passes to block 210.

At block 210, an outer front steer angle, $\delta_{of}$, is calculated using equation (3) wherein the vehicle turn radius R of equation (3) is replaced with $R_M(i)$, the ith entry of vehicle turn radius matrix $R_M$. For example, if the index i has a value of one, then $R_M(i)=R_M(1)$ and, for example, using Table 1, $R_M(1)=5.0000$ m would be the value of $R_M(i)$ used in Block 210 with the index i=1. Control then passes to block 212.

At block 212, an ith front steer angle entry, $\delta_{fM}(i)$, of a front steer angle matrix $\delta_{fM}$, is calculated using equation (4) wherein the values used for $\delta_{if}$ and $\delta_{of}$ are those computed in Blocks 208 and 210. Control is passed to Block 214 where the index i is incremented by one afterwhich control passes to block 216. At Block 216, if the value of the index i is greater than the value of m, then all m front steer angle entries, $\delta_{fM}(i)$, of the front steer angle matrix, $\delta_{fM}$, have been calculated and control proceeds to Block 218 at which flow chart 200 terminates. Otherwise, control passes to Block 208. The value of m is the number of entries of $\delta_{fM}$ and $R_M$. For example, from Table 1, m would have a value of 17. Front steer angle matrix, $\delta_{fM}$, can be stored in memory as a front steer angle look-up table. Each front steer angle entry $\delta_{fM}(i)$ of the front steer angle matrix $\delta_{fm}$ corresponds to a unique vehicle turn radius $R_M(i)$ such that for a given $R_M(i)$ a corresponding $\delta_{fM}(i)$ can be retrieved using the front steer angle look-up table.

A unitless vehicle large geometry correction factor $F_C$ can be introduced into equation (1) to yield a modified steer angle $\delta$, which can be expressed as:

$$\delta = F_C * L/R + K_u * a_y \quad (5)$$

valid for large turn angles as well as small turn angles wherein $F_C$ is defined as:

$$F_C = R * \delta_f / L \quad (6)$$

wherein R is a vehicle turn radius, $\delta_f$ is a front steer angle, and L is a vehicle wheelbase. In the case of $F_C$ having a value close to one, for example differing from 1 by 0.001 (i.e., $F_C = 1 \pm 0.001$), for example $F_C = 0.999$, the results obtained using equation (5) are similar to results obtained using equation (1).

In steady state equilibrium, defined in International Standards Organization (ISO) document 8855, it is well known in the art that:

$$R = V_r / \Omega_R \quad (7)$$

$$a_y = V_r * \Omega_R \quad (8)$$

and $$\Omega_G = \Omega_R / \Omega_f \quad (9)$$

by which $$R = V_r^2 / a_y \quad (10)$$

and $$a_y = V_r * \Omega_G * \delta_f \quad (11)$$

where $V_r$ is a vehicle reference speed, $\Omega_R$ is a steady state vehicle yaw rate, $\Omega_G$ is a steady state vehicle yaw gain, R is a vehicle turn radius, $\delta_f$ is a front steer angle, and $a_y$ is a vehicle lateral acceleration. Hence, using equations (7) through (10), in steady state equilibrium, equation (5) the steady state vehicle yaw gain can be expressed as:

$$\Omega_G = V_r / (F_C * L + K_u * V_r^2). \quad 12)$$

Wherein, the symbol "*" denotes multiplication whenever it appears in equations (1) through (12) and FIGS. 2 through 5.

Figure 3:
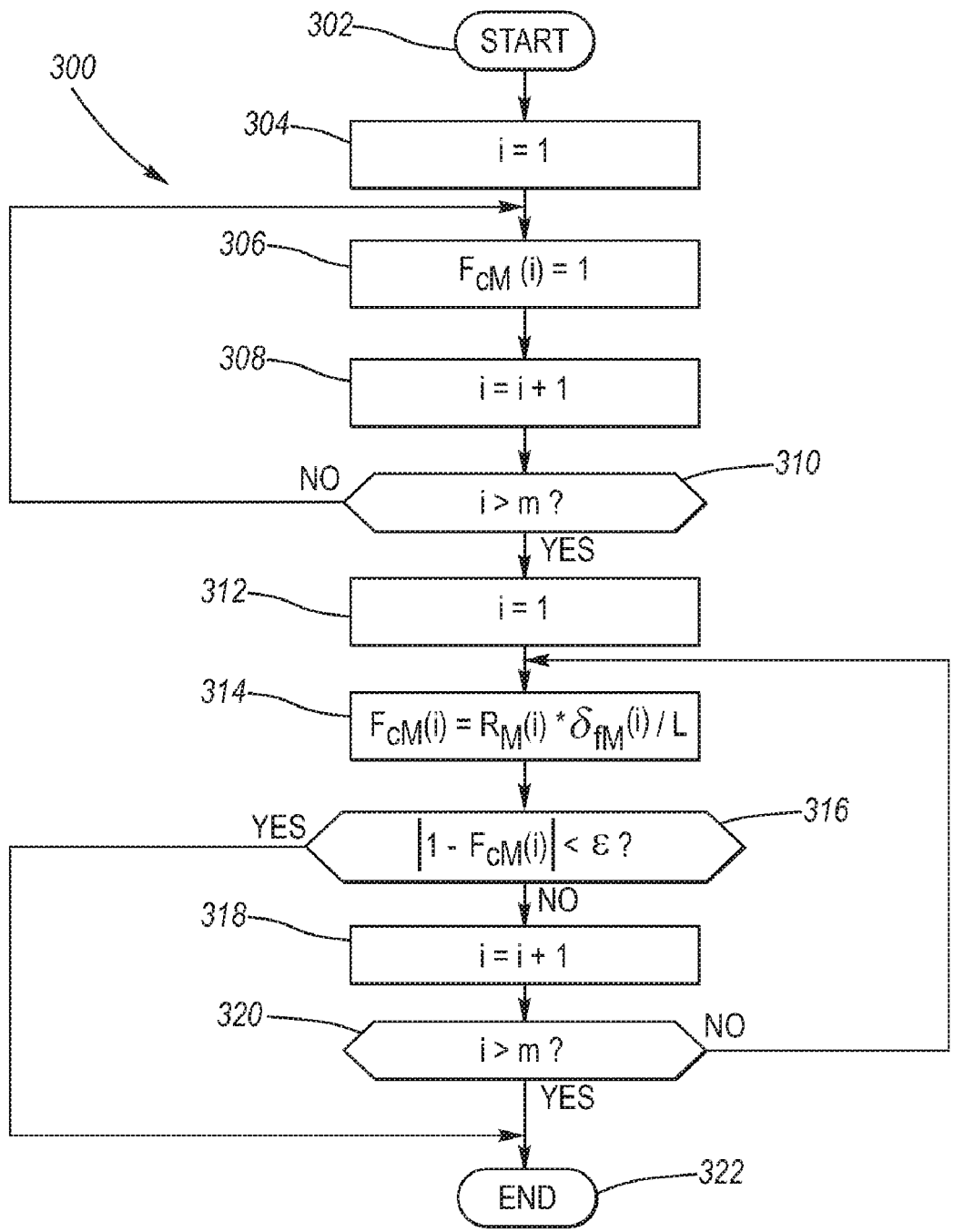
FIG. 3 is a second flow chart by which vehicle large geometry correction factors are generated according to the first preferred embodiment of the present invention.

Referring now to FIG. 3, a second flow chart 300 is shown wherein at least one vehicle large geometry correction factor $F_C$ utilizing equation (6) is generated according to the first preferred embodiment of the present invention. Flow chart 300 starts at Block 302 and proceeds to Block 304 whereat an index i is initiated to a value of one after which control passes to Block 306. At Block 306 the ith vehicle large geometry correction factor entry $F_{CM}(i)$ of a vehicle large geometry correction factor matrix $F_{CM}$ is set equal to a value of one, afterwhich control passes to Block 308, whereat the index i is incremented by one, afterwhich control passes to Block 310. At Block 310, if the value of the index i is greater than the value m then control proceeds to Block 312. Otherwise, control passes to Block 306. The value of m in Block 310 and Block 320 is the number of entries of $F_{CM}$ and corresponds to the number of entries of $R_M$ and $\delta_{fM}$ of flow chart 200 and is equal to the value of m in Block 216 of flow chart 200. For example, from Table 1, m would have a value of 17. Blocks 304-312 initiate all vehicle large geometry correction factor entries $F_{CM}(i)$ of vehicle large geometry correction factor matrix $F_{CM}$ to a value of one.

At Block 312, an index i is initiated to a value of one after which control passes to Block 314. At Block 314, the ith vehicle large geometry correction factor entry $F_{CM}(i)$ of vehicle large geometry correction factor matrix $F_{CM}$ is calculated utilizing equation (6) using the wheelbase L and ith entries of matrices $R_M$ and $\delta_{fM}$ of flow chart 200 afterwhich control passes to Block 316. At Block 316, the ith vehicle large geometry correction factor entry $F_{CM}(i)$ is tested to determine if it is close to a value of one by comparing the absolute value of the difference between one and the ith entry of $F_{CM}(i)$ to a small predetermined value $\epsilon$, for example 0.001. If so, control passes to Block 322, whereat flow chart 300 terminates. Otherwise, control passes to Block 318 where the index i is incremented by one afterwhich control passes to Block 320. The value of ε in Block 316 can be empirically determined to provide a predetermined response, according to the present invention, such that the response of an ESC system would be equivalent to the results obtained using equation (1) instead of equation (5) in the case that Block 316 passes control to Block 322.

At block 320, if the value of the index i is greater than the value of m then control proceeds to Block 322 whereat flow chart 300 terminates. Otherwise, control passes to Block 314. The value of m is the same as the value of m in Block 310. For example, from Table 1, m would have a value of 17. After the at least one vehicle large geometry correction factor entry $F_{CM}(i)$, as a function of at least one $R_M(i)$, is determined, matrix $F_{CM}$ can be stored, for example, in memory as a vehicle large geometry correction factor look-up table, whereby a given value of a vehicle turn radius R corresponds to a vehicle large geometry correction factor $F_C$ entry in the vehicle large geometry correction factor look-up table. Alternatively, a polynomial expression can be determined, whose coefficients can be empirically determined or calculated from the previously determined at least one vehicle large geometry correction factor entry $F_{CM}(i)$ as a function of at least one $R_M(i)$, by means well known in the art, to determine a particular vehicle large geometry correction factor $F_C$ as a function of a given vehicle turn radius.

Figure 4:
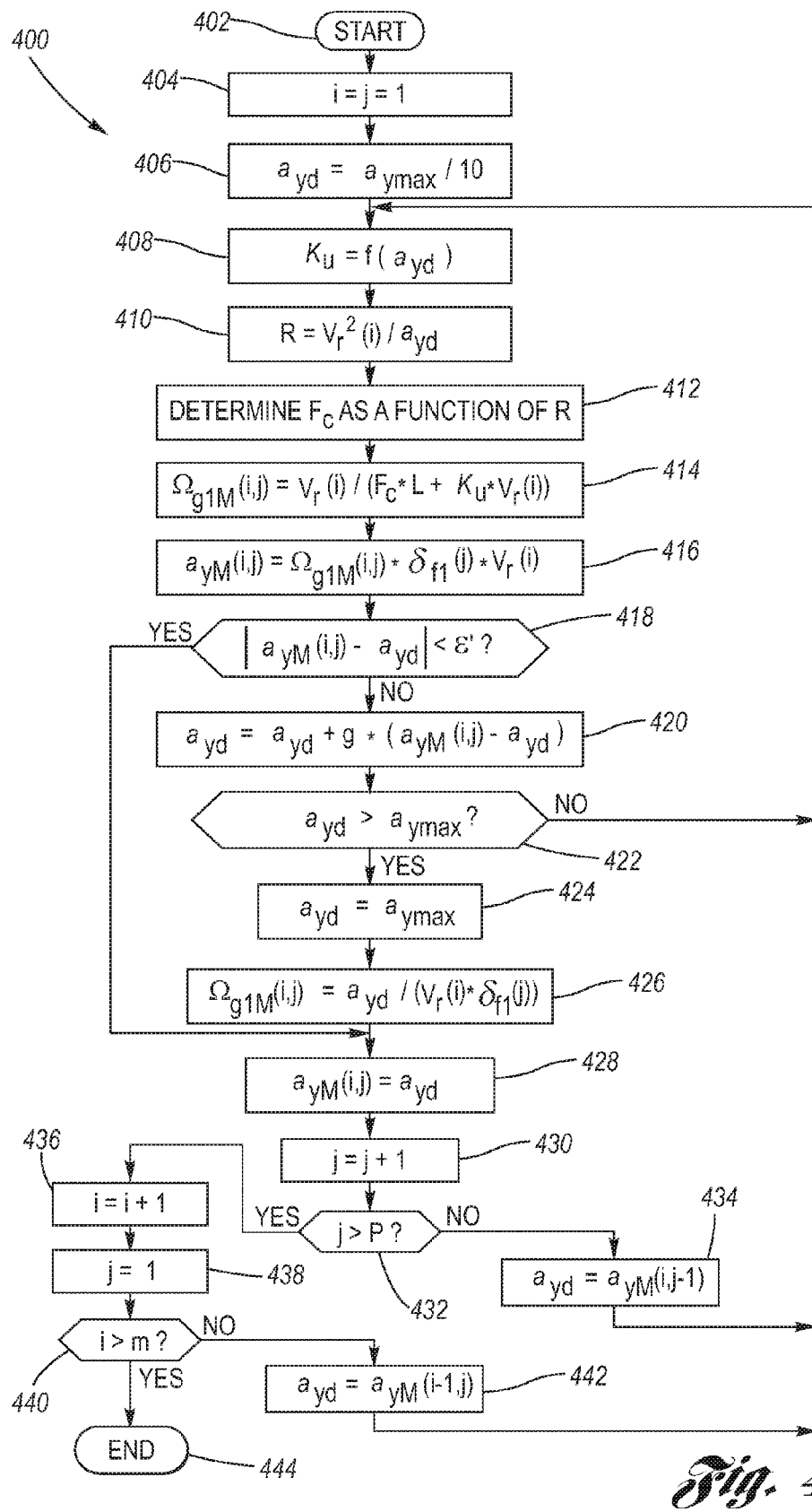
FIG. 4 is a third flow chart algorithmically determining a vehicle first yaw gain matrix according to the first preferred embodiment of the present invention.

FIG. 4 is a third flow chart 400 algorithmically determining a vehicle first yaw gain matrix $\Omega_{g1M}$ according to the first preferred embodiment of the present invention. Flow chart 400 starts at Block 402 and proceeds to Block 404, whereat indices i and j are initiated to a value of one, whereby the index i refers to the rows of vehicle first yaw gain matrix $\Omega_{g1M}$ and vehicle lateral acceleration matrix $a_{yM}$ and the index j refers to the columns of vehicle first yaw gain matrix $\Omega_{g1M}$ and vehicle lateral acceleration matrix $a_{yM}$. The number of rows of vehicle first yaw gain matrix $\Omega_{g1M}$ equals the number of rows of vehicle lateral acceleration matrix $a_{yM}$ and the number of columns of vehicle first yaw gain matrix $\Omega_{g1M}$ equals the number of columns of vehicle lateral acceleration matrix $a_{yM}$.

From Block 404, control passes to Block 406. At Block 406, a desired vehicle lateral acceleration $a_{yd}$ is initialized to a value of $a_{ymax}/10$, for example 1m/s², where $a_{ymax}$ is a predetermined maximum vehicle lateral acceleration which may correspond to a value higher than the vehicle maximum lateral acceleration capability in order to tailor the vehicle yaw response of the ESC system. For example, in the case where the vehicle maximum lateral acceleration capability has been, for example, empirically determined to be 9 m/s², $a_{ymax}$ may be given a value of 10 m/s² to tailor the vehicle yaw response of the ESC system.

Control passes from Block 404 to Block 408 where an understeer gradient $K_u$ is calculated using the results of Block 406 by means well known in the art as previously described. Control then passes to Block 410 whereat a vehicle turn radius R is determined using equation (10) where $a_{yd}$ is determined from Block 406 and vehicle reference velocity $V_r(i)$ is the ith entry of a predetermined vehicle reference velocity matrix or table $V_{rM}$. A vehicle reference velocity $V_r(i)$ represents the longitudinal velocity of a vehicle measured with respect to the center of gravity of a vehicle, which may be ascertained when a vehicle is in motion from the vehicle wheel speeds by techniques well known in the art. The vehicle reference velocity matrix or table $V_{rM}$ has, for example, 33 entries varying between a minimum vehicle reference velocity, typically, zero to a maximum vehicle reference velocity, for example 70m/s. Entries between the minimum vehicle reference velocity and the maximum vehicle reference velocity are empirically spaced to minimize errors. The maximum vehicle reference velocity entry in $V_{rM}$ can be empirically determined for a particular vehicle or vehicle model. An example of a predetermined vehicle reference velocity matrix $V_{rM}$ having 33 entries is given in Table 2.

TABLE 2

Vehicle Reference Speed Matrix $V_{rM}$

| Entry | Vehicle Reference Speeds (m/s) | | | |
|---|---|---|---|---|
| 1-5 | 0.0000 | 0.7828 | 1.5656 | 2.3484 | 3.1312 |
| 6-10 | 3.9140 | 4.6968 | 5.4796 | 6.2624 | 7.0452 |
| 11-15 | 7.8280 | 8.6108 | 9.3936 | 10.1764 | 10.9592 |
| 16-20 | 11.7420 | 12.5248 | 13.3076 | 14.0904 | 14.8732 |
| 21-25 | 15.6560 | 16.4388 | 17.2211 | 19.5382 | 22.2617 |
| 26-30 | 25.4267 | 29.0681 | 33.2210 | 37.9203 | 43.2010 |
| 31-33 | 49.0982 | 55.6468 | 70.000 | | |

Control passes from Block 410 to Block 412 where a vehicle large geometry correction factor $F_C$ is determined as a function of the vehicle turn radius R of Block 410 as detailed by flow chart 300, previously described. In the case of determining $F_C$ in Block 412 through the use of the vehicle large geometry correction factor look-up table determined in flow chart 300, if the value of R of Block 410 is between two adjacent entries of matrix $R_M$, $F_C$ in Block 412 is, preferably, determined by interpolation methods between corresponding entries of matrix $F_{CM}$, preferably cubic, well known in the art. For example, if R is between entries $R_M(3)$ and $R_M(4)$ of matrix $R_M$, $F_C$ in Block 412 is, preferably, determined by cubic interpolation methods using matrix entries $F_{CM}(3)$ and $F_{CM}(4)$ of matrix $F_{CM}$. Control then passes to Block 414.

At Block 414, the ith row and jth column entry $\Omega_{g1M}(i,j)$ of $\Omega_{g1M}$ is calculated using equation (12) where $V_r(i)$ is the ith entry of vehicle reference velocity matrix $V_{rM}$, $F_C$ is the vehicle large geometry correction factor determined in Block 412, $K_u$ is the vehicle understeer gradient determined in Block 408, and L is the vehicle wheelbase. Control then passes to Block 416.

At Block 416, vehicle lateral acceleration entry $a_{yM}(i,j)$ of vehicle lateral acceleration matrix $a_{yM}$ is calculated utilizing equation (11) where $\Omega_{g1M}(i,j)$ is determined from Block 414, $V_r(i)$ is the ith entry of vehicle reference velocity matrix $V_{rM}$, and $\delta_{f1}(j)$ is the jth entry of a predetermined vehicle front steer angle matrix or table $\delta_{f1M}$. The vehicle front steer angle matrix or table $\delta_{f1M}$ has, for example, 33 entries varying between a minimum vehicle front steer angle, typically, zero to a maximum vehicle front steer angle, for example 0.7252 radians. Entries between the minimum vehicle front steer angle and the maximum vehicle front steer angle are empirically spaced to minimize errors. The maximum vehicle front steer angle entry in $\delta_{f1M}$ can be empirically determined for a particular vehicle or vehicle model. An example of a predetermined vehicle front steer angle matrix $\delta_{f1M}$ having 33 entries is given in Table 3.

TABLE 3

Vehicle Front Steer Angle Matrix $\delta_{f1M}$

| Entry | Vehicle Front Steer Angle (radians) | | | | |
|---|---|---|---|---|---|
| 1-5 | 0.0000 | 0.0035 | 0.0070 | 0.0105 | 0.0157 |
| 6-10 | 0.0177 | 0.0213 | 0.0267 | 0.0338 | 0.0427 |
| 11-15 | 0.0533 | 0.0656 | 0.0797 | 0.0955 | 0.1130 |

TABLE 3-continued

Vehicle Front Steer Angle Matrix $\delta_{fM}$

| Entry | Vehicle Front Steer Angle (radians) | | | | |
|---|---|---|---|---|---|
| 16-20 | 0.1323 | 0.1533 | 0.1760 | 0.2005 | 0.2267 |
| 21-25 | 0.2546 | 0.2843 | 0.3157 | 0.3489 | 0.3837 |
| 26-30 | 0.4204 | 0.4587 | 0.4988 | 0.5406 | 0.5842 |
| 31-33 | 0.6294 | 0.6765 | 0.7252 | | |

Control passes from Block 416 to Block 418. At Block 418, the vehicle lateral acceleration entry $a_{yM}(i,j)$ is tested to determine if it is close, with respect to the present invention, to the desired vehicle lateral acceleration $a_{yd}$ by comparing the absolute value of the difference between the vehicle lateral acceleration entry $a_{yM}(i,j)$, determined in Block 416, and the desired vehicle lateral acceleration $a_{yd}$, determined in Block 406, to a small predetermined value $\epsilon'$, for example 0.0001 m/s². If so, control passes to Block 428. Otherwise, control passes to Block 420. The value of $\epsilon'$ can be empirically determined to provide a predetermined response according to the present invention.

At Block 420, the desired vehicle lateral acceleration $a_{yd}$ is recalculated by adding the current $a_{yd}$ to a term consisting of a predetermined gain g multiplied by the difference between $a_{yM}(i,j)$ and the current $a_{yd}$. The gain g has a value, for example, of 0.2 and is empirically determined to control the convergence of $a_{yd}$ within flow chart 400. Control then passes from Block 420 to Block 422 whereat $a_{yd}$ is compared to $a_{ymax}$. If $a_{yd}$ is not greater than $a_{ymax}$ then control passes to Block 408. Otherwise, control passes to Block 424 whereat $a_{yd}$ is set equal to $a_{ymax}$ afterwhich control passes to Block 426.

At Block 426 the ith row and jth column entry $\Omega_{g1M}(i,j)$ of $\Omega_{g1M}$ is calculated using equation (11), where $V_r(i)$ is the ith entry of vehicle reference velocity matrix $V_{rM}$, $a_{yd}$ is the desired vehicle lateral acceleration from Block 424, and $\delta_{f1}(j)$ is the jth entry of vehicle front steer angle matrix or table $\delta_{f1M}$. Control then passes to Block 428, whereat $a_{yM}(i,j)$ is set equal to $a_{yd}$ afterwhich column index j is incremented by one at Block 430 and control then passes to Block 432. At block 432, if the value of column index j is greater than the value of p then control proceeds to Block 434. Otherwise, control passes to Block 436. The value of p is the number of columns of $\Omega_{g1M}$, for example 33. At Block 434, $a_{yd}$ is set equal to $a_{yM}(i,j-1)$. Afterwhich, control passes to Block 408. At block 436, row index i is incremented by one and control passes to Block 438 where column index j is set equal to one. Control then passes to Block 440.

At block 440, if the value of row index i is greater than the value of m then control proceeds to Block 444 whereat flow chart 400 terminates, whereupon the vehicle first yaw gain matrix or table $\Omega_{g1M}$ has been populated. The value of m is the number of rows of $\Omega_{g1M}$, for example 33. Otherwise, control passes to Block 442 whereat $a_{yd}$ is set equal to $a_{yM}(i-1,j)$ and then control passes to Block 408.

Figure 5:
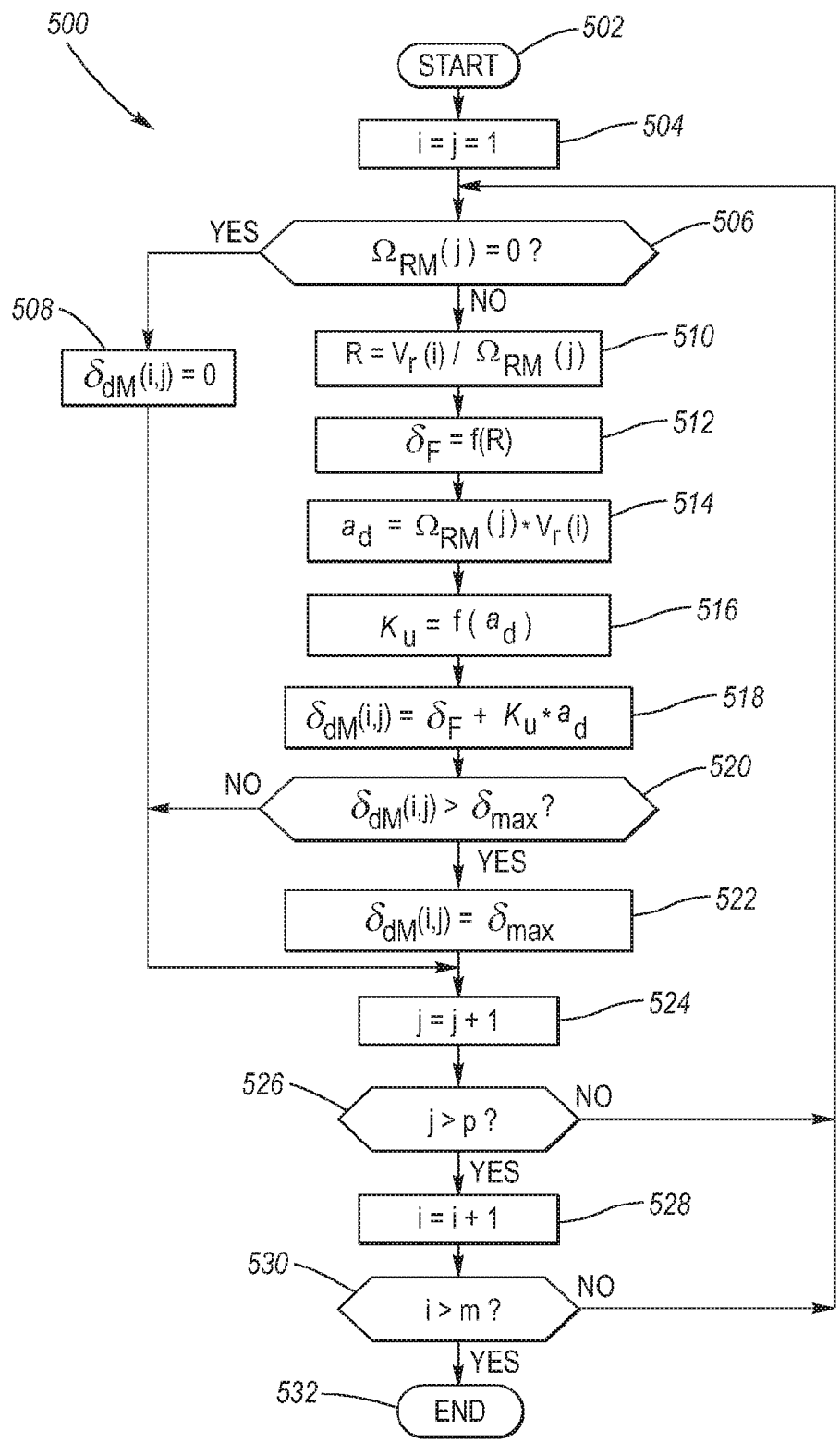
FIG. 5 is a fourth flow chart by which desired front steer angles are computed according to the second preferred embodiment of the present invention.

Referring now to FIG. 5, FIG. 5 is a fourth flow chart 500 by which a vehicle desired front steer angle matrix $\delta_{dM}$ is generated and utilized according to the second or alternative preferred embodiment of the present invention. Flow chart 500 starts at Block 502 and proceeds to Block 504 whereat indices i and j are initiated to a value of one, whereby the index i refers to the rows of vehicle desired front steer angle matrix $\delta_{dM}$ and the index j refers to the columns of vehicle desired front steer angle matrix $\delta_{dM}$. The number of rows of vehicle desired front steer angle matrix $\delta_{dM}$ equals the number of entries of the predetermined vehicle reference velocity matrix $V_{rM}$ as described in flow chart 400 and illustrated in Table 2, for example 33. The number of columns of vehicle desired front steer angle matrix $\delta_{dM}$ equals the number of entries of a predetermined yaw rate matrix or table $\Omega_{RM}$. The yaw rate matrix or table $\Omega_{RM}$ has, for example, 33 entries varying between a minimum yaw rate, typically, zero to a maximum yaw rate, for example 2.0 radians/s. Entries between the minimum yaw rate and the maximum yaw rate are empirically spaced to minimize errors. The maximum yaw rate entry in $\Omega_{RM}$ can be empirically determined for a particular vehicle or vehicle model. An example of a predetermined yaw rate matrix $\Omega_{RM}$ having 33 entries is given in Table 4.

TABLE 4

Yaw Rate Matrix $\Omega_{RM}$

| Entry | Yaw Rate (radians/s) | | | | |
|---|---|---|---|---|---|
| 1-5 | 0.0000 | 0.0625 | 0.1250 | 0.1875 | 0.2500 |
| 6-10 | 0.3125 | 0.3750 | 0.4375 | 0.5000 | 0.5625 |
| 11-15 | 0.6250 | 0.6875 | 0.7500 | 0.8125 | 0.8750 |
| 16-20 | 0.9375 | 1.0000 | 1.0625 | 1.1250 | 1.1875 |
| 21-25 | 1.2500 | 1.3125 | 1.3750 | 1.4375 | 1.5000 |
| 26-30 | 1.5625 | 1.6250 | 1.6875 | 1.7500 | 1.8125 |
| 31-33 | 1.8750 | 1.9375 | 2.0000 | | |

Control passes from Block 504 to Block 506 whereat the jth entry $\Omega_{RM}(j)$ of yaw rate matrix $\Omega_{RM}$ is compared to zero. If so, control passes to Block 508. Otherwise, control passes to Block 510. At Block 508, entry $\delta_{dM}(i,j)$ of $\delta_{dM}$ is set equal to zero and control passes to Block 524. At Block 510, a vehicle turn radius R is determined using equation (7) where vehicle reference velocity $V_r(i)$ is the ith entry of the predetermined vehicle reference velocity matrix or table $V_{rM}$ as described in flow chart 400 and $\Omega_{RM}(j)$ is the jth entry of yaw rate matrix $\Omega_{RM}$. Control then passes to Block 512 where a vehicle front steer angle $\delta_F$ is determined as a function of the vehicle turn radius R of Block 510 as detailed by flow chart 200, previously described. In the case of determining $\delta_F$ in Block 512 through the use of the vehicle front steer angle look-up table determined in flow chart 200, if the value of R of Block 510 is between two adjacent entries of $R_M$, $\delta_F$ in Block 512 is, preferably, determined by interpolation methods between corresponding entries of matrix $\delta_{fM}$, preferably cubic, well known in the art. For example if R is between entries $R_M(3)$ and $R_M(4)$ of matrix $R_M$, $\delta_F$ in Block 512 is, preferably, determined by cubic interpolation methods using matrix entries $\delta_{fM}(3)$ and $\delta_{fM}(4)$ of matrix $\delta_{fM}$. Control then passes to Block 514.

At Block 514, a desired vehicle lateral acceleration ad is determined utilizing equation (8) where vehicle reference velocity $V_r(i)$ is the ith entry of the predetermined vehicle reference velocity matrix or table $V_{rM}$ as described in flow chart 400 and $\Omega_{RM}(j)$ is the jth entry of yaw rate matrix $\Omega_{RM}$. Control then passes to Block 516 where an understeer gradient $K_u$ is calculated using the results of Block 514 by means well known in the art as previously described.

Control passes from Block 516 to Block 518 whereat the ith row and jth column entry $\delta_{dM}(i,j)$ of matrix $\delta_{dM}$ is calculated by adding $\delta_F$ from Block 512 to the product of $K_u$, determined in Block 516, and ad, determined in Block 514. Control then passes to Block 520 whereat $\delta_{dM}(i,j)$, determined from Block 518 is compared to a predetermined maximum front steer angle $\delta_{max}$. If $\delta_{dM}(i,j)$ is not greater than $\delta_{max}$ then control passes to Block 524. Otherwise, control passes to Block 522 whereat $\delta_{dM}(i,j)$ is set equal to $\delta_{max}$, afterwhich control passes to Block 524.

At Block 524, column index j is incremented by one and control then passes to Block 526. At block 526, if the value of column index j is greater than the value of p then control proceeds to Block 528. Otherwise, control passes to Block 506. The value of p is the number of columns of $\Omega_{RM}$, for example 33. At Block 528, row index i is incremented by one and control passes to Block 530. At block 530, if the value of row index i is greater than the value of m then control proceeds to Block 532 whereat flow chart 500 terminates. The value of m is the number of rows of $\Omega_{RM}$, for example 33. Otherwise, control passes to Block 506.

Flow chart 500 of FIG. 5 yields a vehicle desired front steer angle, via matrix $\delta_{dM}$, as a function of a yaw rate, via matrix $\Omega_{RM}$, and a vehicle reference velocity, via matrix or table $V_{rM}$. The matrices $\Omega_{dM}$, $\Omega_{RM}$, and $V_{rM}$ of flow chart 500 of FIG. 5 can, therefore, be utilized to mathematically generate a surface as, for example, surface 700 depicted in FIG. 7, generated by MATLAB, wherein the matrix $\delta_{dM}$ may be considered to be a function of matrices $\Omega_{RM}$ and $V_{rM}$.

Figure 6:
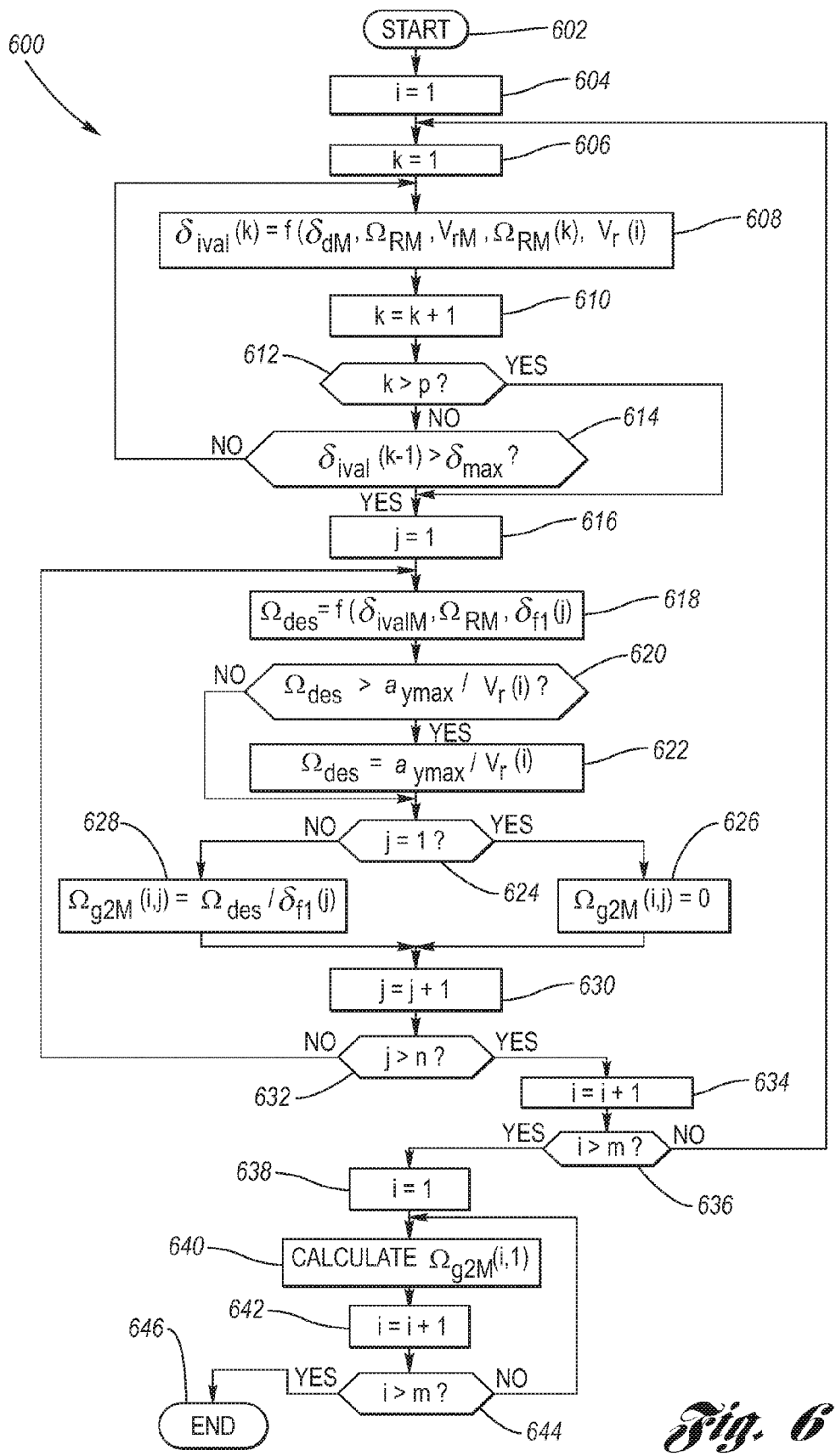
FIG. 6 is a fifth flow chart algorithmically determining a vehicle second yaw gain matrix according to the second preferred embodiment of the present invention.
Figure 8:
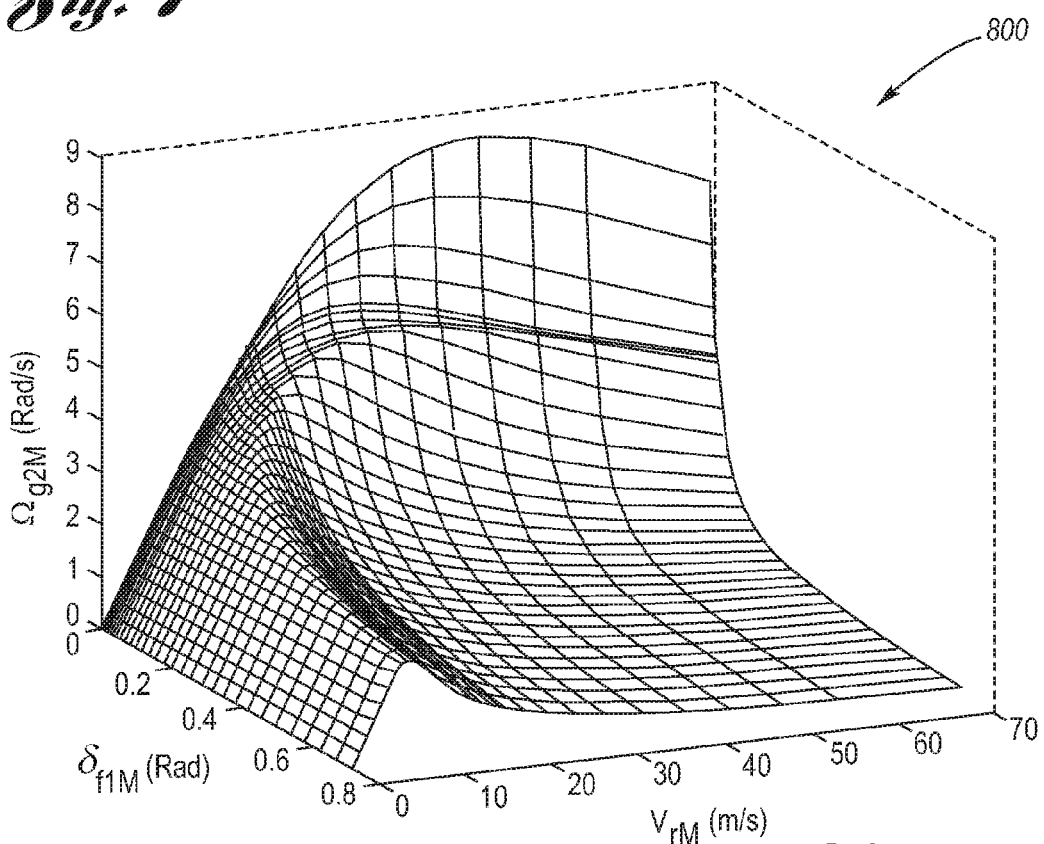
FIG. 8 is a surface plot of vehicle second yaw gain determined from FIG. 6 as a function of vehicle front steer angle and vehicle reference velocity.

Utilizing the results of flow chart 500 of FIG. 5, what is needed, as detailed in FIG. 6, is a vehicle yaw gain, via a second vehicle yaw gain matrix $\Omega_{g2M}$, as a function of a front steer angle, via the front steer angle matrix $\delta_{f1M}$, and a vehicle reference velocity, via the vehicle reference velocity matrix $V_{rM}$. The matrices $\Omega_{g2M}$, $\delta_{f1M}$, and $V_{rM}$ can, thus, be utilized to mathematically generate a surface as, for example, surface 800 depicted in FIG. 8, generated by MATLAB, wherein the matrix $\Omega_{g2M}$ may be considered to be a function of matrices $\delta_{f1M}$ and $V_{rM}$.

FIG. 6 is a fifth flow chart 600 algorithmically determining a vehicle second yaw gain matrix $\Omega_{g2M}$ according to the second preferred embodiment of the present invention. Flow chart 600 starts at Block 602 and proceeds to Block 604 whereat index i is initiated to a value of one, whereby the index i refers to the rows of vehicle second yaw gain matrix $\Omega_{g2M}$. Control then passes to Block 606 whereat index k is initiated to a value of one. The value of the index k varies from one to a value less than or equal to the number of columns of vehicle second yaw gain matrix $\Omega_{g2M}$. Control then passes from Block 606 to Block 608.

Figure 7:
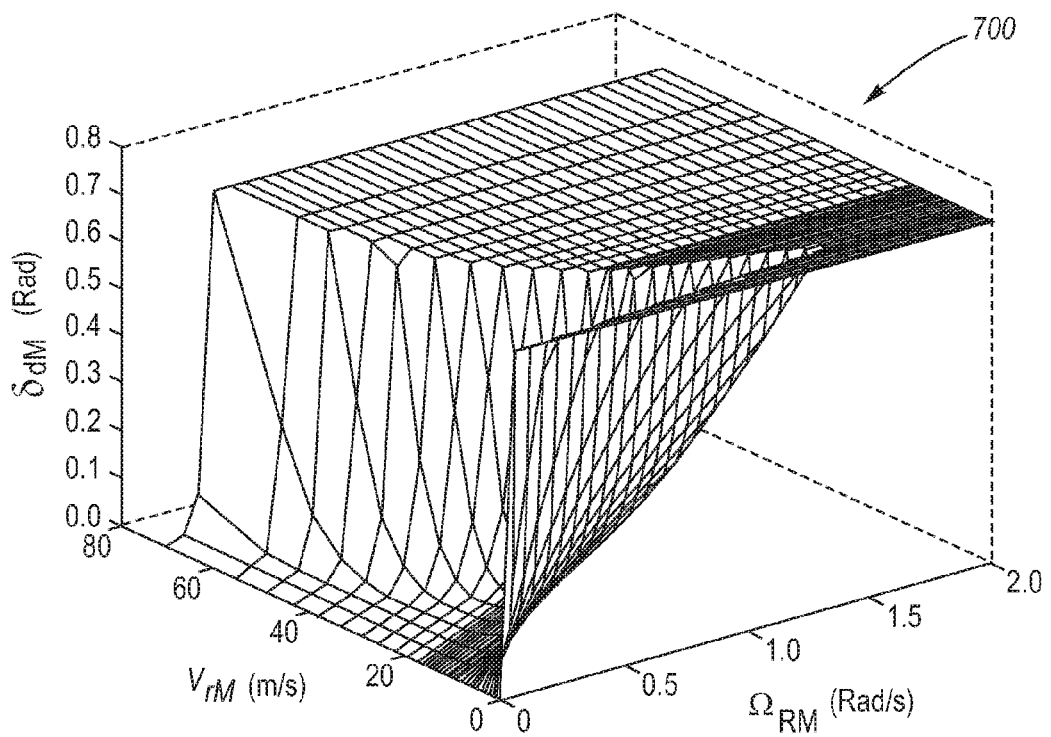
FIG. 7 is a surface plot of vehicle desired front steer angle determined from FIG. 5 as a function of vehicle yaw rate and vehicle reference velocity.

At Block 608, the kth matrix entry $\delta_{ival}(k)$ of intermediate road wheel angle matrix $\delta_{ivalM}$ is calculated as a function of matrices $\delta_{dM}$, $\Omega_{RM}$, and $V_{rM}$ and matrix entries $\Omega_{RM}(k)$ and $V_r(i)$ of flow chart 500 of FIG. 5 utilizing the surface mathematically generated from matrices $\Omega_{dM}$, $\Omega_{RM}$, and $V_{rM}$ as, for example surface 700 of FIG. 7, previously described. The kth matrix entry $\delta_{ival}(k)$ of intermediate road wheel angle matrix $\delta_{ivalM}$ is calculated by, preferably, linear interpolation utilizing matrix entries $\Omega_{RM}(k)$ and $V_r(i)$ in conjunction with, for example, the surface 700 by techniques well known in the art.

Control then passes to Block 610, whereat k is incremented by one afterwhich control passes to Block 612. At Block 612 if k is greater than p, then control passes to Block 616. Otherwise, control passes to Block 614. The value of p refers to the number of columns of $\Omega_{g2M}$, for example 33.

At Block 614, if the (k−1) matrix entry $\delta_{ival}(k-1)$ of intermediate road wheel angle matrix $\delta_{ivalM}$ is greater than the predetermined maximum front steer angle $\delta_{max}$ then control passes to Block 616. Otherwise, control passes to Block 608. At Block 616, j is incremented by one and control passes to Block 618.

At Block 618 a desired vehicle yaw rate $\Omega_{des}$ is calculated as a function of matrices $\delta_{ivalM}$ and $\Omega_{RM}$, described in FIG. 5 and depicted, by way of example, in Table 4, and matrix entry $\delta_{f1}(j)$, described in FIG. 4 and depicted, by way of example, in Table 3. The matrices $\delta_{ivalM}$ and $\Omega_{RM}$ can be utilized to mathematically generate a plot wherein the elements of matrix $\delta_{ivalM}$ are, for example, along the y-axis and the elements of matrix $\Omega_{RM}$ are, for example, along the x-axis. The value of a given point on the y-axis, denoted by $\delta_{f1}(j)$, corresponding to the value of the y coordinate at a given point on the plot, is associated with the value of the x coordinate of the given point on the plot, whereby the value of the x coordinate of the given point on the plot on the x-axis is denoted by $\Omega_{des}$. Control then passes to Block 620.

At Block 620, if $\Omega_{des} > a_{ymax}/V_r(i)$, wherein $a_{ymax}$ was previously described in flow chart 400 of FIG. 4, then control passes to Block 622. Otherwise, control passes to Block 624. At Block 622 $\Omega_{des}$ is set equal to $a_{ymax}/V_r(i)$ and control passes to Block 624. At Block 624 if j=1, then control passes to Block 626. Otherwise, control passes to Block 628.

At Block 626, matrix entry $\Omega_{g2M}(i,j)$ is set equal zero and then control passes to Block 630. At Block 628, matrix entry $\Omega_{g2M}(i,j)$ is set equal to $\Omega_{des}/\delta_{f1}(j)$ and then control passes to Block 630. At Block 630, column index j is incremented by one and then control passes to Block 632.

At Block 632, if j>n, wherein the value of n is the number of columns of $\Omega_{g2M}$, for example 33, control passes to Block 634. Otherwise, control passes to Block 618. At Block 634, row index i is incremented by one, then control passes to Block 636. At Block 636, if i>m, wherein the value of m is the number of rows of $\Omega_{g2M}$, for example 33, control passes to Block 638. Otherwise, control passes to Block 606. At Block 638, row index i is set equal to one and then control passes to Block 640.

The first column of matrix $\Omega_{g2M}$ was set equal to zero in Block 626. At Block 640, the first column of matrix entry $\Omega_{g2M}(i,1)$ of matrix $\Omega_{g2M}$ is calculated by extrapolation of matrix entries $\Omega_{g2M}(i,2)$ and $\Omega_{g2M}(i,3)$ of matrix $\Omega_{g2M}$ using, preferably, a polynomial fit, by techniques well known in the art. Control then passes to Block 642, whereat row index i is incremented by one. Control passes from Block 642 to Block 644. At Block 644, if i>m wherein the value of m is the number of rows of $\Omega_{g2M}$, for example 33, control passes to Block 646, whereat flow chart 600 terminates, and whereupon the vehicle second yaw gain matrix or table $\Omega_{g2M}$ has been populated. Otherwise, control passes to Block 640.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A recursive method for populating values of a yaw gain table for an electronic stability control system of a motor vehicle, comprising the steps of:
   providing a motor vehicle having an electronic stability control system, wherein the electronic stability control system has a yaw gain table requiring population;
   determining geometry of the motor vehicle;
   determining a plurality of front steer angles as a function of a plurality of turn radii of the motor vehicle responsive to said step of determining geometry;
   determining for each turn radii a large angle geometry correction factor as a function of the plurality of turn radii responsive to said step of determining a plurality of front steer angles;
   providing an understeer gradient for the motor vehicle; and
   recursively populating the values of the yaw gain table as a function of predetermined reference speeds of the motor vehicle and predetermined front steer angles of the motor vehicle responsive to said determined plurality of front steer angles, the determined large angle geometry correction, and the provided understeer gradient, whereupon the yaw gain table has acquired the required population.

2. The method of claim 1, wherein said step of providing comprises performing a plurality of step steer tests on the motor vehicle.

3. The method of claim 1, wherein:
the values populating the yaw gain table have a predetermined correspondence to lateral acceleration of the motor vehicle, and wherein the values are limited in correspondence to a predetermined maximum lateral acceleration of the motor vehicle; and
the predetermined maximum lateral acceleration exceeds a maximum lateral acceleration capability of the motor vehicle.

4. The method of claim 3, wherein said step of providing comprises performing a plurality of step steer tests on the motor vehicle.

5. A recursive method for populating values of a yaw gain table for an electronic stability control system of a motor vehicle, comprising the steps of:
providing a motor vehicle having an electronic stability control system, wherein the electronic stability control system has a yaw gain table requiring population;
determining geometry of the motor vehicle to thereby obtain a first table, wherein each entry of the first table denotes a front steer angle of the motor vehicle as a function of vehicle turn radius;
determining at least one large angle geometry correction factor as a function of at least one vehicle turn radius using at least one entry of the first table;
providing an understeer gradient of the motor vehicle; and
recursively populating the yaw gain table, wherein each entry of the yaw gain table represents a unique vehicle yaw gain as a function of at least a vehicle reference speed and a front steer angle derived from at least the vehicle large geometry correction factor and the vehicle understeer gradient, whereupon the yaw gain table has acquired the required population.

6. The method of claim 5, wherein the understeer gradient is a function of, at least, a desired vehicle lateral acceleration.

7. The method of claim 6, wherein:
the values populating the yaw gain table have a predetermined correspondence to lateral acceleration of the motor vehicle, and wherein the values are limited in correspondence to a predetermined maximum lateral acceleration of the motor vehicle; and
the predetermined maximum lateral acceleration exceeds a maximum lateral acceleration capability of the motor vehicle.

8. The method of claim 7, wherein said step of providing comprises performing a plurality of step steer tests on the motor vehicle.

9. An open loop method for populating values of a yaw gain table for an electronic stability control system of a motor vehicle, comprising the steps of:
providing a motor vehicle having an electronic stability control system, wherein the electronic stability control system has a yaw gain table requiring population;
determining geometry of the motor vehicle;
determining a plurality of front steer angles as a function of a plurality of turn radii of the motor vehicle responsive to said step of determining geometry;
providing an understeer gradient for the motor vehicle;
populating a steer angle table as a function of predetermined yaw rates of the motor vehicle and predetermined vehicle speed vectors of the motor vehicle responsive to the determined plurality of front steer angles and the provided understeer gradient; and
populating the values of the yaw gain table as a function of predetermined reference speeds of the motor vehicle and predetermined yaw rates of the motor vehicle responsive to the populated steer angle table, whereupon the yaw gain table has acquired the required population.

10. The method of claim 9, wherein said step of providing comprises performing a plurality of step steer tests on the motor vehicle.

11. The method of claim 9, wherein the understeer gradient is a function of, at least, a desired vehicle lateral acceleration.

12. The method of claim 9, wherein:
the values populating the yaw gain table have a predetermined correspondence to lateral acceleration of the motor vehicle, and wherein the values are limited in correspondence to a predetermined maximum lateral acceleration of the motor vehicle; and
the predetermined maximum lateral acceleration exceeds a maximum lateral acceleration capability of the motor vehicle.

13. The method of claim 12, wherein the understeer gradient is a function of, at least, a desired vehicle lateral acceleration.

14. The method of claim 13, wherein said step of providing comprises performing a plurality of step steer tests on the motor vehicle.

* * * * *